Nov. 10, 1970   M. McKAY RAUHUT ET AL   3,539,794
SELF-CONTAINED CHEMILUMINESCENT LIGHTING DEVICE
Filed Sept. 12, 1967   4 Sheets-Sheet 1

INVENTORS
MICHAEL McKAY RAUHUT
GEORGE WARREN KENNERLY
BY

ATTORNEY

Nov. 10, 1970  M. McKAY RAUHUT ET AL  3,539,794

SELF-CONTAINED CHEMILUMINESCENT LIGHTING DEVICE

Filed Sept. 12, 1967  4 Sheets-Sheet 2

INVENTORS
MICHAEL McKAY RAUHUT
GEORGE WARREN KENNERLY
BY

ATTORNEY

Nov. 10, 1970    M. McKAY RAUHUT ET AL    3,539,794
SELF-CONTAINED CHEMILUMINESCENT LIGHTING DEVICE
Filed Sept. 12, 1967    4 Sheets-Sheet 3

INVENTORS
MICHAEL McKAY RAUHUT
GEORGE WARREN KENNERLY
BY

ATTORNEY

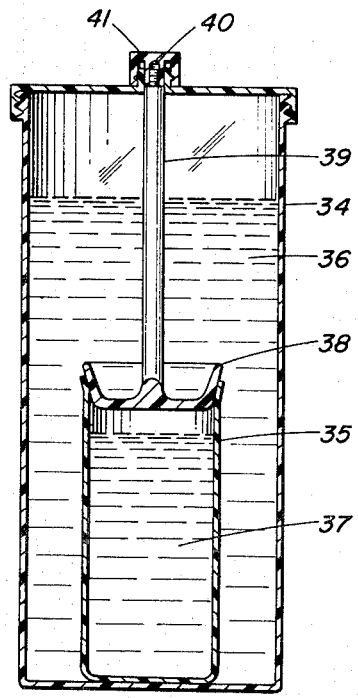
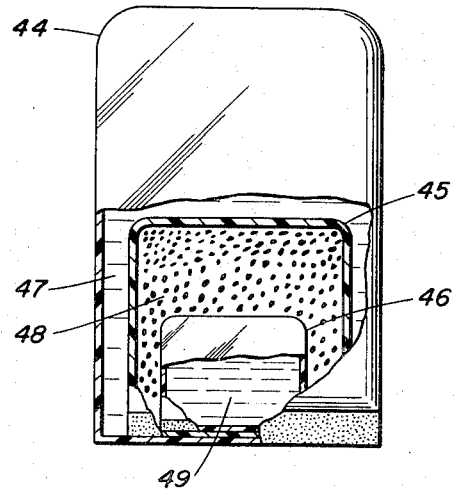
FIG.15
FIG.16
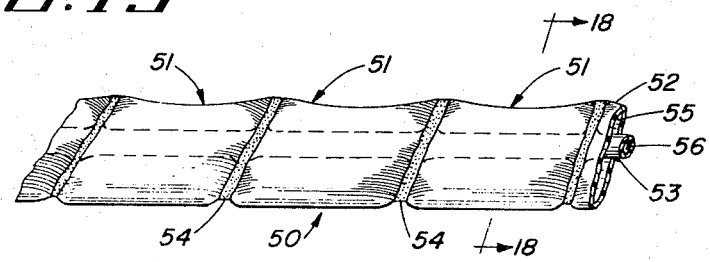
FIG.17
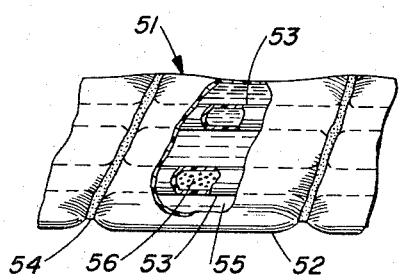
FIG 19
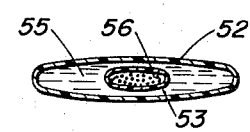
FIG.18
INVENTORS
MICHAEL McKAY RAUHUT
GEORGE WARREN KENNERLY
BY
ATTORNEY United States Patent Office 3,539,794
Patented Nov. 10, 1970

3,539,794
SELF-CONTAINED CHEMILUMINESCENT
LIGHTING DEVICE
Michael McKay Rauhut, Norwalk, and George Warren Kennerly, Darien, Conn., assignors to American Cyanamid Company, Stamford, Conn., a corporation of Maine
Filed Sept. 12, 1967, Ser. No. 667,116
Int. Cl. F21v 9/16
U.S. Cl. 240—2.25                    10 Claims

ABSTRACT OF THE DISCLOSURE

Self-contained devices for providing chemiluminescent light from a chemical reaction of suitable compounds in the presence of a fluorescent compound, in which the chemiluminescent components are stored, admixed and from which the chemiluminescent light is displayed.

---

Figure 1:
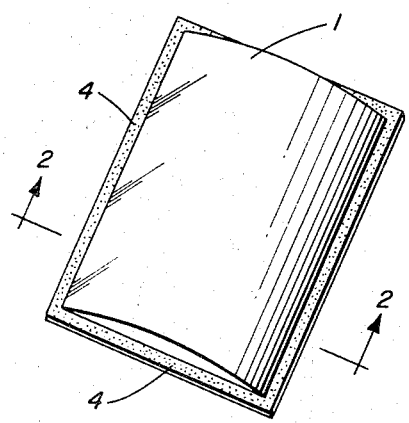

This invention relates to systems and devices for providing chemiluminescent light incorporating chemical components which react chemically and provide excitation for a fluorescent compound. The invention more particularly relates to systems and devices whereby the reactive components are maintained in a non-reactive condition until light is desired, the systems incorporating means to bring said components into a reactive condition and means to display the resultant light.

Under certain circumstances, it is desirable to have a source of visible light which is not electrically activated. Light can be provided by chemical systems, wherein the luminosity is solely the result of chemical reaction without provision of any electrical energy. Such light is known as chemiluminescent light.

Chemiluminescent light may be useful where there is no source of electricity. For example, in emergencies where sources of electrical power have failed, a chemiluminescent system could provide light. Such emergencies could occur in a crash landing of an aircraft, a power failure in a submarine or in underground installations or during any electrical power failure. Moreover, chemiluminescent light is cold light and can be used where the heat of conventional illumination is not desired. It is also useful where electrical means could cause a fire hazard, such as in the presence of inflammable agents. Chemiluminescent light is also effective under water since there are no electrical connections to short out. Thus it may be seen that chemiluminescent light can have many useful applications.

A principal object of the present invention is to provide systems and devices incorporating chemiluminescent components for the provision of chemiluminescent light.

A further object of this invention is to provide means for containing chemically reactive chemiluminescent components in a non-reactive condition and means to combine said components when desired to provide chemiluminescent light.

Another object of the invention is to provide chemiluminescent lighting systems and devices having light display means.

These and other objects of the invention will become apparent as the description thereof proceeds.

The chemiluminescent system of this invention comprises (1) a device accommodating the admixture of at least two chemiluminescent components and providing for the display of the resulting chemiluminescent mixture in the device and (2) at least two chemiluminescent components comprising either (a) a component containing a chemiluminescent compound and a second component containing a hydroperoxide compound or (b) a solid component containing both a solid chemiluminescent compound and a solid hydroperoxide compound and a second component comprising a solvent for said solid chemiluminescent compound and said solid hydroperoxide compound. Any other necessary ingredients for the production of chemiluminescent light, or for lifetime control, or for intensity improvement, or for storage stabilization must of course either be included in one of the two system components or included as additional components. In particular with the preferred oxalic-type chemiluminescent compounds of this invention, a fluorescent compound must be included in the system.

The preferred chemiluminescent light is obtained in this invention by the reaction of a hydroperoxide with a chemiluminescent composition which, in combination, comprises a chemiluminescent compound selected from the group consisting of (1) an oxalic-type anhydride of the type disclosed and claimed in the copending application, Ser No. 485,920, now U.S. Pat. 3,399,137, which is hereby incorporated by reference, (2) an oxalic-type amide of the type disclosed and claimed in copending applications, Ser. Nos. 520,052, now U.S. Pat. 3,442,815, and 547,782, now abandoned, which are hereby incorporated by reference, (3) an oxalic-type O-acylhydroxylamine of the type disclosed and claimed in copending application, Ser. No. 547,761, now abandoned, and (4) an oxalic-type ester in application, Ser. No. 491,896, now abandoned, in the presence of a fluorescer compound, and a solvent. Other suitable chemiluminescent compounds are 3-aminophthalhydrazide, 2,4,5-triphenylimidazole, 10,10′ - dialkyl-9,9′-biacridinium salts, and 9-chlorocarbonyl-10-methylacridinium chloride. The latter is disclosed and claimed in copending application, U.S. Ser. No. 472,459, now U.S. Pat. 3,352,791. All of the foregoing provide chemiluminescence when reacted with a hydroperoxide compound in the presence of a base. Other chemiluminescent materials are described by K. D. Gunderman, Angew. Chemie, Int. Ed., 4, 566/1965.

The preferred chemiluminescent compound of this invention is an oxalic-type ester selected from the group consisting of (a) an ester of an oxalic-type acid and an alcohol characterized by acid ionization constant in water greater than $1.3 \times 10^{-10}$, and (b) a vinyl ester of an oxalic-type ester. Similarly, in a preferred embodiment thereof, the alcohol would be an aromatic alcohol substituted by a substituent characterized by a positive Hammett sigma value. The preferred species of oxalic-type esters include bis(substituted-phenyl)oxalate such as bis (2 - nitrophenyl)oxalate, bis(2,4 - dinitrophenyl) oxalate, bis(2,6 - dichloro - 4 - nitrophenyl)oxalate, bis- (2,4,6 - trichlorophenyl)oxalate, bis(3 - trifluoromethyl-4-nitrophenyl)oxalate, bis(2-methyl - 4,6 - dinitrophenyl) oxalate, bis(1,2 - dimethyl - 4,6 - dinitrophenyl)oxalate, bis(2,4 - dichlorophenyl)oxalate, bis(2,5 - dinitrophenyl) oxalate, bis(2 - formyl - 4 - nitrophenyl)oxalate, bis(pentachlorophenyl)oxalate, bis(1,2 - dihydro - 2 - oxo - 1-pyridyl)glyoxal, bis-N-phthalmidyl oxalate. The preferred sub-species is bis(pentachlorophenyl)oxalate.

The peroxides employed in the components of this invention may be any hydroperoxide compound. Typical hydroperoxides include t-butylhydroperoxide, peroxybenzoic acid, and hydrogen peroxide. Hydrogen peroxide is the preferred hydroperoxide and may be employed as a solution of hydrogen peroxide in a solvent or as an anhydrous hydrogen peroxide compound such as perhydrate of urea (urea peroxide), perhydrate of pyrophosphate (sodium pyrophosphate peroxide), perhydrate of histidine (histidine peroxide), sodium perborate, sodium peroxide, and the like. Whenever hydrogen peroxide is contemplated to be employed, any suitable compound may be substituted which will produce hydrogen peroxide.

The peroxide concentration may range from about 15 molar down to about $10^{-5}$, preferably about 2 molar down to about $10^{-2}$ molar. The ester of this invention may be added as a solid or in admixture with a suitable solid peroxide reactant or in a suitable diluent, or alternatively dissolved directly in a solution containing the peroxide reactant.

Typical diluents, which additionally may be used in conjunction with the necessary diluent of this invention, are those which do not readily react with a peroxide such as hydrogen peroxide, and which do not react with an ester of oxalic acid.

Where a solvent is employed with the hydroperoxide-containing component of this invention said solvent can be any fluid which is unreactive toward the hydroperoxide and which accommodates a solubility of at least 0.01 M hydroperoxide. Typical solvents for the hydroperoxide component include water; alcohols, such as ethanol or octanol; ethers, such as diethyl ether, diamyl ether, tetrahydrofuran, dioxane, dibutyldiethyleneglycol, perfluoropropyl ether, and 1,2-dimethoxyethane; and esters, such as ethyl acetate, ethyl benzoate, dimethyl phthalate, di-octylphthalate, propyl formate. Solvent combinations can, of course, be used such as concentrations of the above with aromatic anisole, tetralin, and polychlorobiphenyls, providing said solvent combination accommodates hydroperoxide solubility. However, when oxalic-type chemiluminescent materials are used, strong electron donor solvents such as dimethyl formamide, dimethyl sulfonide, and hexamethylphosphoramide should not, in general, be used as a major solvent component.

Whe a solvent is employed with the component containing the chemiluminescent material any fluid can be used providing said fluid solubilizes at least 0.005 M concentration of the chemiluminescent material and is unreactive toward the chemiluminescent material. Typical solvents include ethers, esters, aromatic hydrocarbons, chlorinated aliphatic and aromatic hydrocarbons, such as those cited in the preceding paragraph. For oxalic-type chemiluminescent compounds, hydroxylic solvents such as water or alcohols and basic solvents such as pyridine should not be employed since such solvents used in general, react with and destroy oxalic-type chemiluminescent compounds. Solvent combinations may, of course, be used but such combinations when used with oxalic-type chemiluminescent compounds should not include strong electron donor solvents.

When a component comprising a solid chemiluminescent compound and a solid hydroperoxide is used, the solvent or solvent composition comprising the second component may vary broadly. Said solvent, however, should preferably dissolve at least 0.002 M concentrations of both, the hydroperoxide and the chemiluminescent compound, and for oxalic-type chemiluminescent compounds, strong electron donor solvents should be avoided as major solvent components.

The fluorescent compounds contemplated herein are numerous; and they may be defined broadly as those which do not readily react on contact with the peroxide employed in this invention, such as hydrogen peroxide; likewise, they do not readily react on contact with the chemiluminescent compound.

A fluorescent compound is required for light emission when the prepared oxalic-type chemiluminescent compound of the invention is employed. For other types of chemiluminescent compounds a fluorescer is not required but may be used to shift the wavelength of emitted light toward the red region of the spectrum so as to change the color of emitted light. Fluorescent compounds for use with oxalic-type chemiluminescent compounds should be soluble in the reactive solvent at least to the extent of 0.0001 mole per liter.

Typical suitable fluorescent compounds for use in the present invention are those which have a spectral emission falling between 330 millimicrons and 1000 millimicrons and which are at least partially soluble in any of the above diluents, if such diluent is employed. Among these are the conjugated polycyclic aromatic compounds having at least 3 fused rings, such as anthracene, substituted anthracene, benzanthracene, phenanthrene, substituted phenanthrene, naphthacene, substituted naphthacene, pentacene, substituted pentacene, and the like. Typical substituents for all of these are phenyl, lower alkyl, chlorine, bromine, cyano, alkoxy ($C_1$–$C_{16}$), and other like substituents which do not interfere with the light-generating reaction contemplated herein.

Numerous other fluorescent compounds having the properties given hereinabove are well known in the art. Many of these are fully described in "Fluorescence and Phosphorescence," by Peter Pringsheim, Interscience Publishers, Inc., New York, N.Y., 1949. Other fluorescers are described in "The Colour Index," Second Edition, volume 2, The American Association of Textile Chemists and Colorists, 1956, pp. 2907–2923. While only typical fluorescent compounds are listed hereinabove, the person skilled in the art is fully aware of the fact that this invention is not so restricted and that numerous other fluorescent compounds having similar properties are contemplated for use herein.

It should be noted, however, that although a fluorescent compound is necessary to obtain the production of light, the fluorescent compound is not necessary to obtain a chemical reaction and chemical energy release. Also, a fluorescent oxalic-type ester, such as the oxalic acid ester of 2-naphthol-3,6,8-trisulfonic acid, does not require a separate fluorescent compound to obtain light. Other typical fluorescent oxalic acid esters include esters of oxalic acid (1) 2-carboxyphenol, (2) 2-carboxy-6-hydroxyphenol, (3) 1,4-dihydroxy-9,10-diphenylanthracene, and (4) 2-naphthol. Thus, a reactant including a fluorescent oxalic-type ester would thereby include at least one fluorescent compound.

It has been found that the molar (moles per liter of diluent) concentrations of the major components of the novel composition herein described may vary considerably. It is only necessary that components be in sufficient concentration to obtain chemiluminescence. The ester of oxalic acid molar concentration normally is in the range of at least about $10^{-4}$ to 5 molar, preferably in the range of at least about $10^{-3}$ to about 1 molar; the fluorescent compound is present in the range from about $10^{-5}$ to 5, preferably $10^{-4}$ to $10^{-1}$ molar; and the diluent must be present in a sufficient amount to form at least a partial solution of the reactants involved in the chemiluminescent reaction. If the ester is liquid, it may serve as either the sole diluent or a partial diluent.

The ingredients of the composition of this invention may be admixed in a single stage of admixing or in a sequence of steps of admixing the separate ingredients.

The wavelength of the light emitted by chemiluminescence of the compositions of this invention, i.e., the color of the light emitted, may be varied by the addition of any one or more energy transfer agents (fluorescers) such as the known fluorescent compounds discussed at length above.

The wavelength of the light emitted by the composition of this invention will vary, depending upon the particular fluorescent component employed in the reaction.

Additionally, it has been found that the superior intensity of chemiluminescence is obtained when the final mixture producing the luminescence is maintained at a temperature of between about −40° C. and 75° C., preferably between about 20° C. and 50° C. However, temperature is not critical and the luminescence of applicants' process is not limited to these ranges.

The lifetime and the intensity of the chemiluminescent light obtained with the preferred oxalic-type chemiluminescent compounds of this invention can be regulated by the use of certain regulators such as:

(1) By the addition of base to the chemiluminescent composition. Both the strength and the concentration of the base are critical for purposes of regulation.

(2) By the variation of hydroperoxide. Both the type and the concentration of hydroperoxide are critical for the purposes of regulation.

(3) By the addition of water.

(4) By the addition of a catalyst which changes the rate of reaction of hydroperoxide with the oxalic-type ester. Catalysts which accomplish that objective include those described in M. L. Bender, "Chem. Revs.," vol. 60, p. 53 (1960). Also, catalysts which alter the rate of reaction or the rate of chemiluminescence include those accelerators of copending application, Ser. No. 577,595, now abandoned, and decelerators of copending application, Ser. No. 577,615 now abandoned.

While acids are not in general accelerators for oxalic-type chemiluminescent reactions it should be noted specifically that acids are accelerators for the oxalic amide chemiluminescent compounds of copending application, Ser. No. 547,782.

More specifically, the advantages obtained by the corporation of a catalyst of Ser. No. 577,595 may be obtained in conjunction with the objects of this present invention, by employing, according to the copending application, an ionized salt having a cation selected from (a) an organic quaternary cation selected from the group consisting of ammonium, arsenic, and phosphorous, and (b) alkali metal having an atomic weight above 22, the salt of said cation preferably being soluble in an organic solvent and preferably being characterized by a property of forming cation-aggregates when reacted with the oxalic-type ester and a hydroperoxide. One of the advantages is the fact that an excessive amount of the chemiluminescent agent may be employed whereby a higher quantum yield may be obtained when the ionized salt is employed.

Similarly, within the scope of the present invention is the concurrent employment of one or more decelerators either alone in the composition of this invention, or in conjunction with one or more of the accelerators discussed in the preceding paragraphs. By employing one of the accelerators of the preceding paragraph, it would be possible to employ a greater total concentration of the chemiluminescent agent while concurrently would be possible to employ a decelerator which would prolong the period during which the light of high intensity is obtained from the chemiluminescent reaction. Such decelerators set forth in the copending application, Ser. No. 577,615, include for example compounds such as oxalic acid, lactic acid, malonic acid, adipic acid, aluminum sulfate, sodium sulfate and barium chloride.

When oxalate-type chemiluminescent compounds are used in a solution component it may be desirable to include a stabilizing agent such as those described in copending application, Ser. No. 614,397, now pending.

The chemical compounds, components and their reactions for providing chemiluminescent light are described in copending, commonly assigned applications, Ser. Nos. 442,802, now U.S. Pat. 3,329,621; 442,818 now U.S. Pat. 3,425,949, and those previously mentioned, and as such they do not form a part of the present invention.

The present invention is a self-contained chemiluminescent light device. In its broadest aspects, in the present invention, the reactive components are stored in a multiple compartment container device at least one of which is light transmitting, that is transparent or translucent to the chemiluminescent light, having means to bring the separate components into contact to produce the reaction which provides chemiluminescent light, and means to display the fluid in said transparent container. A minimum of two compartments is required in the device. When either the chemiluminescent compounds, hydroperoxide, or both are fluid, they must be in separate compartments. The diluent and fluorescent compounds can be in either of these two compartments. If the chemiluminescent compounds, hydroperoxide and fluorescent compounds are dry powdered solids, they may be kept together in one compartment with the diluent in the other compartment. Means are provided to bring the components in each compartment together in a transparent compartment and to display the combined components as a chemiluminescent light mixture. The translucent container in which light mixture may be mixed may be of any desired configuration to provide visible light in various display forms. It will be understood that the term light transmitting is intended to include both transparent and translucent and the use of either of these terms is intended to include the other. Thus, the inventive device comprises a closed container which is light transmitting for containing and displaying a chemiluminescent mixture and additional means to maintain the components of the mixture separated and non-reactive until the light display is desired. The device may have an outer transparent container, flexible or rigid, which is divided into separate compartments by a rupturable or removable wall. It may be a flexible, transparent container, divided into two compartments by a clamp applied externally or by a seal between the opposed layers of the container. It can also be a transparent, flexible container having a separate inner container being itself flexible or rigid. Alternatively, the inner container may be rupturable or openable by means external of the outer container. In addition, the device may consist of a series of elongated flexible containers in a ribbon form. In any of the inventive devices, the essential features are that there are at least two separate compartments, for containing chemiluminescent components in a non-reactive condition, at least one being transparent, means to admix the components whereby the chemiluminescent admixture is contained in the transparent compartment and the device may be used as a light.

The invention may be better understood by reference to the drawings in which,

FIGS. 1 to 4 show embodiments of the invention incorporating a wall divider forming separate compartments for the chemiluminescent components, FIGS. 5 to 10 show embodiments of a device being divided into compartments by a clamp or seal, FIGS. 11 to 16 show embodiments of a device having one compartment within another, and FIGS. 17 to 19 show embodiments of compartments in a continuous strip device.

Figure 2:
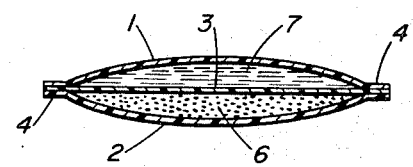

In the embodiment of FIGS. 1 and 2, the device constitutes a container having an upper layer 1, a lower layer 2 and an intermediate diver wall 3. Layers 1 and 2 are sealed at the edges 4 with wall 3. Layers 1 and 2 are of any suitable flexible translucent material such as polyethylene film, polypropylene, or the like, and wall 3 is a thin, easily rupturable material which is inert and impervious with respect to the chemiluminescent components. A solid, powdered chemiluminescent component is in compartment 6, and a liquid chemiluminescent component is in compartment 7. In such an arrangement, it is possible to place a dry chemiluminescent compound and a dry hydroperoxide compound in compartment 6 and the diluent in compartment 7. The dry fluorescer compound may be in either compartment. Alternatively, compartments 6 and 7 may both contain a liquid component. For example, compartment 6 may contain the chemiluminescent compound with the diluent and compartment 7 may contain a solution of hydrogen peroxide and the fluorescer. As another alternative, one of the compartments may contain a matrix such as a sponge, blotting paper, felt, or the like with one Cl component absorbed in it, either in a moist or dry state. The matrix could be transparent and it could incorporate a reflective coating on the surface. When it is desired to use the device, external pressure on flexible layers 1 and 2 ruptures wall 3 and permits admixing of the components to obtain the reaction and provide chemiluminescent light. The transparent container thus constitutes a self-contained light source. It will be understood that the container may be elongated or of any suitable configuration. In particular, the embodiment incorporating the matrix may be extensive in area and hung as a light panel since the Cl mixture will remain distributed throughout the entire area absorbed in the matrix, instead of flowing in the container. Such a device is very convenient in that it is easily manufactured and inexpensive, and requires no handling of ingredients before or after use. It may be easily used and disposed of as a dry package. It is moreover not affected by external conditions and may be used in water. The device thus constitutes a very convenient source of light.

Figure 3:
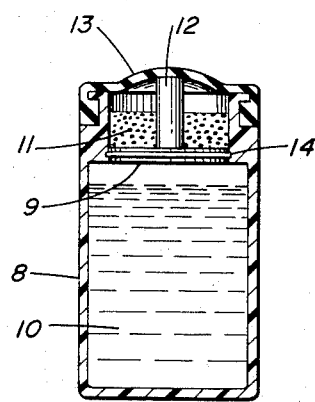
Figure 4:
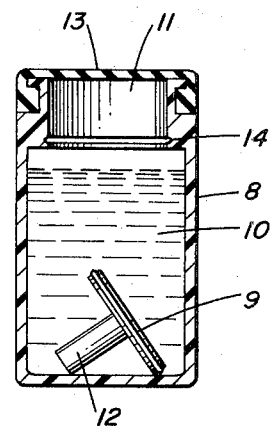

In the embodiment of FIG. 3, the chemiluminescent device has a translucent container 8, having a divider wall 9 which forms compartments 10 and 11. Divider wall 9 has an extension 12. A flexible cover 13 is provided to close compartment 11. Compartments 10 and 11 are filled with chemiluminescent components as described previously in connection with the embodiment of FIG. 1. Container 8 is a rigid or semirigid translucent material such as polyethylene, polypropylene, an acrylic type plastic, Teflon and the like. Wall 9 is fitted in an annular groove 14 and is made of any material inert and impervious with respect to the chemiluminescent components. Cover 13 may be rubber, plastic or the like. When the device is to be used, pressure on rod 12 displaces wall 9, as shown in FIG. 4, to permit admixture of the contents of compartments 10 and 11, providing a chemiluminescent mixture in the translucent container 8 for use as a source of light. It will be understood that container 8 and wall 9 may be arranged in any manner, and may be molded together with container 8, in which case it is necessary to provide a filler opening, not shown, for compartment 10. Moreover, wall 8 may be very thin and broken by incorporating a heavy object such as a ball bearing (not shown) in one of compartments 10 or 11 and shaking the device. In this case, cover 13 may be solid and rod 12 is not necessary.

Figure 5:
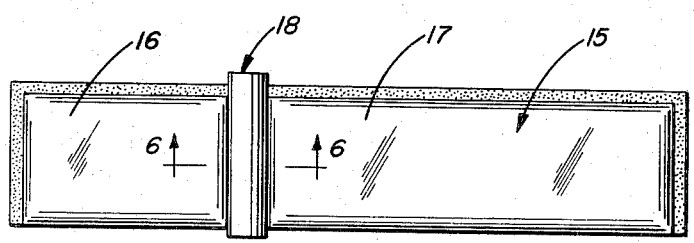
Figure 6:
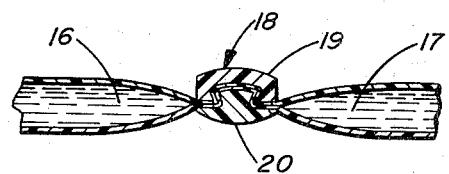

FIGS. 5 and 6 show an embodiment of the invention having a single, flexible bag-like structure 15, divided into two compartments 16 and 17 by a clamp means 18 having interlocking parts 19 and 20. Compartments 16 and 17 are filled with chemiluminescent components which are maintained separately by clamp 18. When clamp 18 is removed, the chemiluminescent components are admixed and chemiluminescent light is provided in container 15. Container 15 may be of any suitable flexible plastic material which is translucent. An advantage of the embodiment of FIG. 5 is that the relative size of compartments 16 and 17 may be varied as desired by placement of clamp 18. Moreover, the construction is very simple and easy to make, inexpensive, and simple to operate.

Figure 8:
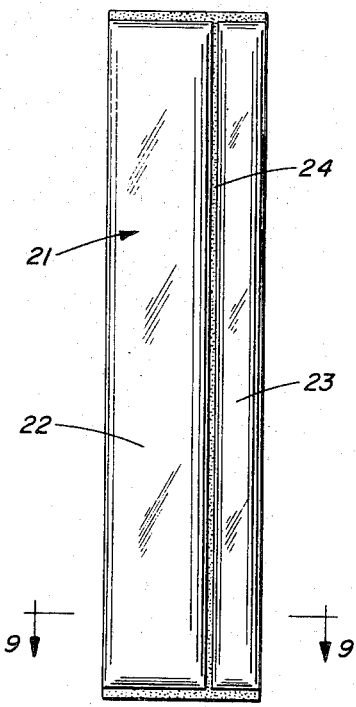
Figure 7:
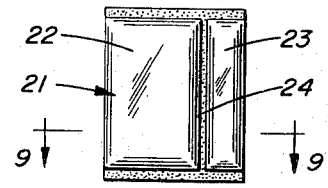
Figure 10:
Figure 9:
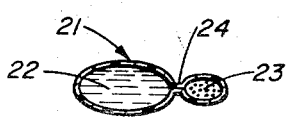

The embodiment of FIGS. 7 to 11 is similar to that of FIGS. 5 and 6 in that it is a single, flexible, translucent bag-like container 21 divided into two compartments 22 and 23. However, in the embodiment of FIG. 7, the compartments are formed by sealing together the walls to form a dividing seal 24. This may be done, as well known in the art, by adhesive or heat sealing. Chemiluminescent components are contained in compartments 22 and 23 and maintained separate by seal 24, as shown in FIG. 9. By external pressure, seal 24 may be ruptured and the chemiluminescent components may be admixed to form a chemiluminescent admixture in container 21 as a source of light, as shown in FIG. 10. The device may be in elongated form as shown in FIG. 8.

Figures 11, 12, 13:
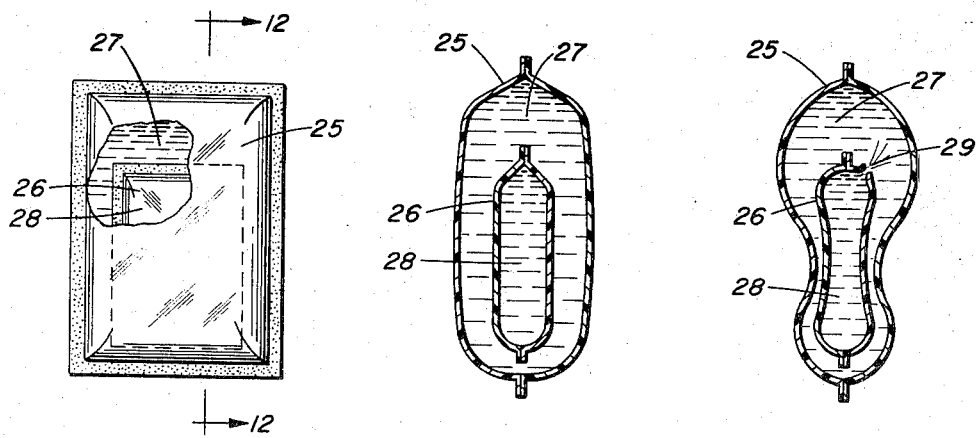

In the embodiment of FIGS. 11 to 13, the chemiluminescent device has an outer, flexible translucent container 25 and an inner separate container 26, forming compartments 27 and 28 respectively. Inner container 26 is of a material which is readily rupturable and is inert and impervious to the chemiluminescent components. The inner container 26 may also be transparent, but it need not be so. As shown in FIG. 12, compartments 27 and 28 contain chemiluminescent components. External pressure on container 25, as shown in FIG. 13, causes rupture of the inner container 26, e.g., at point 29, and permits the chemiluminescent component of compartments 27 and 28 to be admixed with the chemiluminescent component of compartment 26 to permit reaction and obtaining chemiluminescent light. The chemiluminescent light mixture is then visible in translucent container 25 and forms a source of light.

Figure 14:
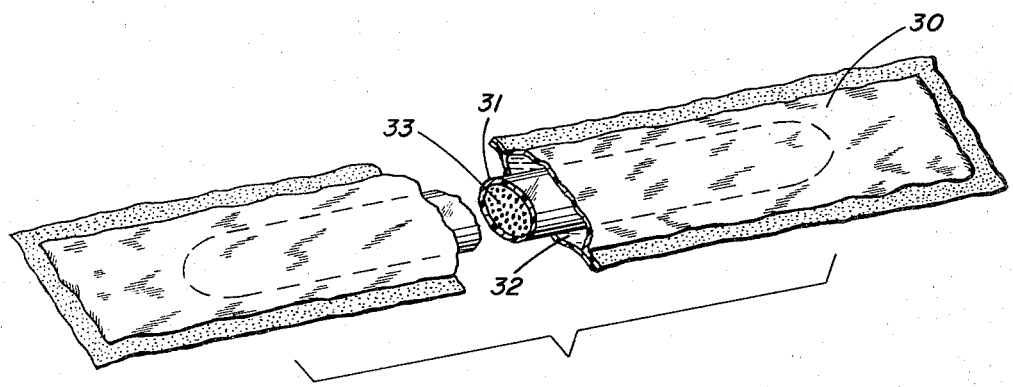

In FIG. 14, an embodiment is shown which is similar to that of FIGS. 11 to 13. In FIG. 14, the outer container 30 is a flexible translucent material, with an inner, elongated rigid frangible container 31, which may be translucent, but need not be. Containers 30 and 31 form respective compartments 32 and 33 for chemiluminescent components. Admixing of the components may be accomplished by bending container 30 which will break rigid container 31 to bring about admixture of the chemiluminescent components in translucent container 30. The chemiluminescent mixture in container 30 serves as a source of light.

As shown in the embodiment of FIG. 15, there is an outer container 34 of rigid translucent material having an inner container 35, which may or may not be translucent. Containers 34 and 35 form compartments 36 and 37 respectively for separate chemiluminescent components. Inner container 35 is closed by cover 38 having a rod 39 attached which passes through the top of container 34 at opening 40. A threaded cap 41 is attached to the upper end of rod 39, to close opening 40. In order to use the device, cap 41 is unscrewed and pulled upwards which removes cover 38 from container 35 by means of rod 39. The chemiluminescent components in compartments 36 and 37 are then admixed to form a chemiluminescent mixture as a source of light displayed in translucent container 34. As shown, container 34 has a top 42 and a bottom 43 threaded thereon. Either or both covers 42 and 43 need not be transparent or translucent but may be opaque as desired. It is obvious that container 35 could be a rupturable material and rod 39 could be adapted to cause rupture when moved up or down and that other modifications could be used.

FIG. 16 shows an embodiment of the invention in which the outer container is a resilient translucent plastic material such as polypropylene. Teflon, or the like. Inner container 45 is flexible or frangible and may be translucent but need not be. As shown, an additional inner container 46, which is similar to container 45, may be used. Thus, compartments 47, 48 and 49 are formed for three separate chemiluminescent components. This may be desirable where additional agents are employed such as acids, bases, rate regulators (accelerators and decelerators), and the like. The chemiluminescent light is produced by external pressure on resilient outer container 44 which ruptures the inner containers 45 and 46 and admixes the contents of compartments 47, 48 and 49 to obtain the display of chemiluminescent light in translucent outer container 44.

In FIGS. 17, 18 and 19 an embodiment is shown in which the chemiluminescent containers are arranged in a repeating strip form 50. Each container 51 is a self-contained chemiluminescent light device having an outer container 53. Outer container 52 is a transparent or translucent, flexible plastic material, and inner container 53 is preferably a flexible, rupturable plastic but need not be transparent. Each device 51 is joined to the next as shown at 54, preferably by the continuation of the outer container 52 which is heat or adhesively sealed at this point. As shown in FIG. 18, containers 52 and 53 form compartments 55 and 56 respectively for chemiluminescent components. By external pressure on container 52, container 53 may be ruptured to admix the chemiluminescent components and obtain a chemiluminescent light mixture in container 51. The device 50 may be used by cutting off a single unit 51 at line 54 and applying pressure to obtain light. Or, a number of units 51 could be pressed, as by passing the strip through squeezing rollers to obtain a longer strip of light. It will be obvious that one side of the device can be provided with a pressure sensitive adhesive and the strip of light can be applied to a surface. A number of strips can be used to form a message or warning. It will be further obvious that there may be more than one inner container 53.

Moreover, in the embodiment of FIG. 17, the inner container 53 could be a separate, rupturable capsule such as shown in the embodiment of FIG. 11. In addition, this embodiment could incorporate a thin absorbable matrix, as previously described.

It will be further obvious that the inventive device may use pull strips (not shown) for admixing the contents of the separate compartments by having strips extending outside the device which are attached to and are adapted to remove the separating barrier when pulled.

In addition, a transparent double bag of the type shown in FIGS. 7 to 10, and having a pull strip as above could be used in a rigid transparent holder similar to the outer container 34 of FIG. 15. It will further be obvious that various holding means could be incorporated with the inventive devices such as handles, hooks and the like. Moreover, where desired, the display container can incorporate a reflective layer to intensify or direct the light.

It will be further apparent that the absorbable matrix described can be incorporated in the device as desired, and is particularly suited for relatively thin, large area devices.

Thus modifications, changes and combinations of the embodiments illustrated will be obvious. Moreover, it will be obvious that any suitable material may be used for the containers, so long as the containers for the final chemiluminescent light mixture is light transmitting and closed. The materials should also be inert and impervious to the chemiluminescent components. In addition, the plastic sheet material may be of more than one layer and type of plastic as required by the intended use, environment and chemiluminescent components.

The invention provides systems and devices for providing visible light whenever and wherever desired, independent of conventional electrical lighting methods and without the hazards of electric lighting. The chemiluminescent lighting systems can be especially useful in emergency situations where all other forms of lighting have failed. The systems do not have the fire hazard of ignitable lighting devices such as candles, gas, or oil lights.

It will be readily apparent that the chemiluminescent systems are not confined to emergency lighting, however. They can be used at any time where a cold, safe illuminating means is desired. They are also useful to provide illumination where electrical illumination is unavailable. Such systems can also be made highly portable. Moreover, the applications are varied and numerous in view of the possibility of using configurated display means and the ability of the chemiluminescent composition to take such configurated forms due to its fluid state.

We claim:
1. A self-contained chemiluminescent lighting device comprising closed container means having at least two compartments, said container means being capable of transmitting light, said compartments being separated by seal means, a chemiluminescent component in each of said compartments, said components comprising the ingredients (1) a chemiluminescent compound, (2) a fluorescer, (3) a peroxide, and (4) a diluent, wherein said ingredients are segregated in said compartments in such a way as to prevent a chemical reaction, said seal means being adapted to be operable to permit communication between said compartments and admixing of said components to cause chemical reaction and obtain visible chemiluminescent light emission from said light transmitting container means.

2. The device of claim 1 wherin at least one of said components is in a fluid state.

3. The device of claim 1 comprising at least two components in separate compartments adapted to communicate with one another.

4. The device of claim 3 wherein at least one of said compartments is light transmitting.

5. The device of claim 4 comprising means to empty the component of one compartment into said light transmitting container.

6. The device of claim 4 including removable seal means to prevent said communication until desired and means to remove said seal means.

7. The device of claim 1 wherein a chemiluminescent component is incorporated in a matrix.

8. A chemiluminescent device according to claim 1 wherein one chemiluminescent component comprising a dry oxalate-type compound and a dry hydrogen peroxide compound, and said second chemiluminescent component comprises a diluent for said one component.

9. A chemiluminescent device according to claim 1 wherein one chemiluminesent component comprises a chemiluminescent oxalate-type compound and a second chemiluminescent compound comprises a hydrogen peroxide compound.

10. A chemiluminescent device according to claim 9 wherein said oxalate-type compound is an ester of oxalic acid and an alcohol, said alcohol being characterized by an ionization constant in water greater than $1.3 \times 10^{-10}$.

References Cited
UNITED STATES PATENTS

| | | | |
|---|---|---|---|
| 3,366,572 | 1/1968 | Scott et al. | 252—188.3 |
| 3,095,291 | 6/1963 | Robbins | 62—4 |
| 3,058,313 | 10/1962 | Robbins | 62—4 |
| 2,420,286 | 5/1947 | Lacey et al. | 252—188.3 |

CARL D. QUARFORTH, Primary Examiner

S. J. LECHERT, JR., Assistant Examiner

U.S. Cl. X.R.

206—84; 252—188.3